(12) United States Patent
Kasugai

(10) Patent No.: US 11,372,615 B2
(45) Date of Patent: Jun. 28, 2022

(54) IMAGING APPARATUS

(71) Applicant: Panasonic Intellectual Property Management Co., Ltd., Osaka (JP)

(72) Inventor: Hiroki Kasugai, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/963,393

(22) PCT Filed: Jun. 10, 2019

(86) PCT No.: PCT/JP2019/022943
§ 371 (c)(1),
(2) Date: Jul. 20, 2020

(87) PCT Pub. No.: WO2019/244695
PCT Pub. Date: Dec. 26, 2019

(65) Prior Publication Data
US 2021/0072950 A1 Mar. 11, 2021

(30) Foreign Application Priority Data
Jun. 19, 2018 (JP) .............................. JP2018-116373

(51) Int. Cl.
*G06F 3/16* (2006.01)
*H04N 5/232* (2006.01)
*H04R 3/00* (2006.01)

(52) U.S. Cl.
CPC ......... *G06F 3/165* (2013.01); *H04N 5/23293* (2013.01); *H04R 3/00* (2013.01)

(58) Field of Classification Search
CPC combination set(s) only.
See application file for complete search history.

(56) References Cited

U.S. PATENT DOCUMENTS 10,051,142 B1* 8/2018 Villena ................ H04N 1/2166
2002/0057351 A1* 5/2002 Suzuki ............... H04N 1/00405
386/E5.072

(Continued)

FOREIGN PATENT DOCUMENTS

JP 2000-125167 A 4/2000
JP 200741393 A 2/2007

(Continued)

OTHER PUBLICATIONS

International Search Report for corresponding Application No. PCT/JP2019/022943, dated Aug. 13, 2019.

(Continued)

*Primary Examiner* — Duc Nguyen
*Assistant Examiner* — Assad Mohammed
(74) *Attorney, Agent, or Firm* — Renner, Otto, Boisselle & Sklar, LLP

(57) ABSTRACT

An imaging apparatus includes: a first display; a second display; a speaker configured to output a sound effect in response to a predetermined operation; and a controller configured to control an output of the sound effect from the speaker. The controller is operable to: in a case of the first display set as operable, cause the speaker to output a sound effect having a first frequency characteristic in response to the predetermined operation; and in a case of the second display set as operable, cause the speaker to output a sound effect having a second frequency characteristic in response to the predetermined operation, the second frequency characteristic being different from the first frequency characteristic.

10 Claims, 10 Drawing Sheets

(56) References Cited

U.S. PATENT DOCUMENTS

| | | | |
|---|---|---|---|
| 2004/0246342 A1 | 12/2004 | Kim et al. | |
| 2006/0061659 A1* | 3/2006 | Niwa | H04N 5/23293 348/207.99 |
| 2010/0295983 A1* | 11/2010 | Nozawa | H04N 5/225251 348/333.01 |
| 2011/0115936 A1* | 5/2011 | Choi | H04N 5/23219 348/222.1 |
| 2012/0327262 A1 | 12/2012 | Arakawa | |
| 2013/0271647 A1 | 10/2013 | Ohtsuka | |
| 2015/0194931 A1* | 7/2015 | Otsuka | H03F 3/181 381/120 |
| 2015/0312466 A1* | 10/2015 | Ishii | H04N 9/8042 348/211.1 |

FOREIGN PATENT DOCUMENTS

| | | |
|---|---|---|
| JP | 2010-026459 A | 2/2010 |
| WO | 2011/111296 A1 | 9/2011 |

OTHER PUBLICATIONS

International Preliminary Report on Patentability for corresponding Application No. PCT/JP2019/022943, dated Dec. 30, 2020, English translation.
Supplementary European Search Report for European Application No. 19823433.8 dated Jul. 8, 2021.

* cited by examiner

IMAGING APPARATUS

TECHNICAL FIELD

The present disclosure relates to an imaging apparatus providing an electronic sound effect in accordance with a predetermined operation such as a shutter operation.

BACKGROUND ART

Patent Document 1 discloses an imaging device outputting a predetermined sound. The imaging device includes imaging means capturing an image of a subject, a finder allowing a photographer looking into the finder to view the subject captured by the imaging means, sound output means outputting a predetermined sound, detecting means disposed around an eyepiece part of the finder to detect a human body approaching the eyepiece part, and volume change control means providing control to change a volume of the sound output from the sound output means when the detecting means detects a human body approaching the eyepiece part. This imaging device allows the photographer to easily adjust the volume of the sound output from the sound output means without taking the trouble to select a menu item displayed on the menu screen for adjustment.

CITATION LIST

Patent Document

Patent Document 1: JP 2010-26459 A

SUMMARY OF INVENTION

Technical Problem

Various sound effects such as a shutter sound and a self-timer sound are electronically generated and provided from an imaging apparatus. For example, the shutter sound is generated as an electronic sound imitating mechanical operation of a mechanical shutter (e.g., a focal plane shutter) and allows a user to recognize that an image is taken; however, since a constant electronic sound is emitted, the user may feel a sense of discomfort in audibility depending on a user's shooting position (e.g., shooting with the finder or shooting with the monitor).

The present disclosure provides an imaging apparatus outputting an electronically generated sound effect such as a shutter sound, capable of outputting the sound effect preventing a user from feeling a sense of discomfort in audibility depending on a user's shooting position.

Solution to Problem

An aspect of the present disclosure includes a first display apparatus, a second display apparatus, a speaker configured to output a sound effect in response to a predetermined operation, and a controller configured to control an output of the sound effect from the speaker. The controller is operable to: in a case of the first display apparatus set as operable, cause the speaker to output a sound effect having a first frequency characteristic in response to the predetermined operation; and in a case of the second display apparatus set as operable, cause the speaker to output a sound effect having a second frequency characteristic in response to the predetermined operation, the second frequency characteristic being different from the first frequency characteristic.

According to the imaging apparatus of the present disclosure, the electronically generated sound effect is differentiated in frequency characteristics between a case that the user performs shooting with the face brought close to the imaging apparatus and a case that the user performs shooting with the face separated away from the imaging apparatus. As a result, the sound effect can be output to the user without causing the user to feel the sense of discomfort in audibility.

DESCRIPTION OF EMBODIMENTS

Embodiments will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art. The accompanying drawings and the following description are provided by the present inventor(s) for sufficient understanding of the present disclosure by those skilled in the art, and it is not intended to limit the subject matter described in claims thereto.

First Embodiment

[1-1. Configuration]

Figure 1:
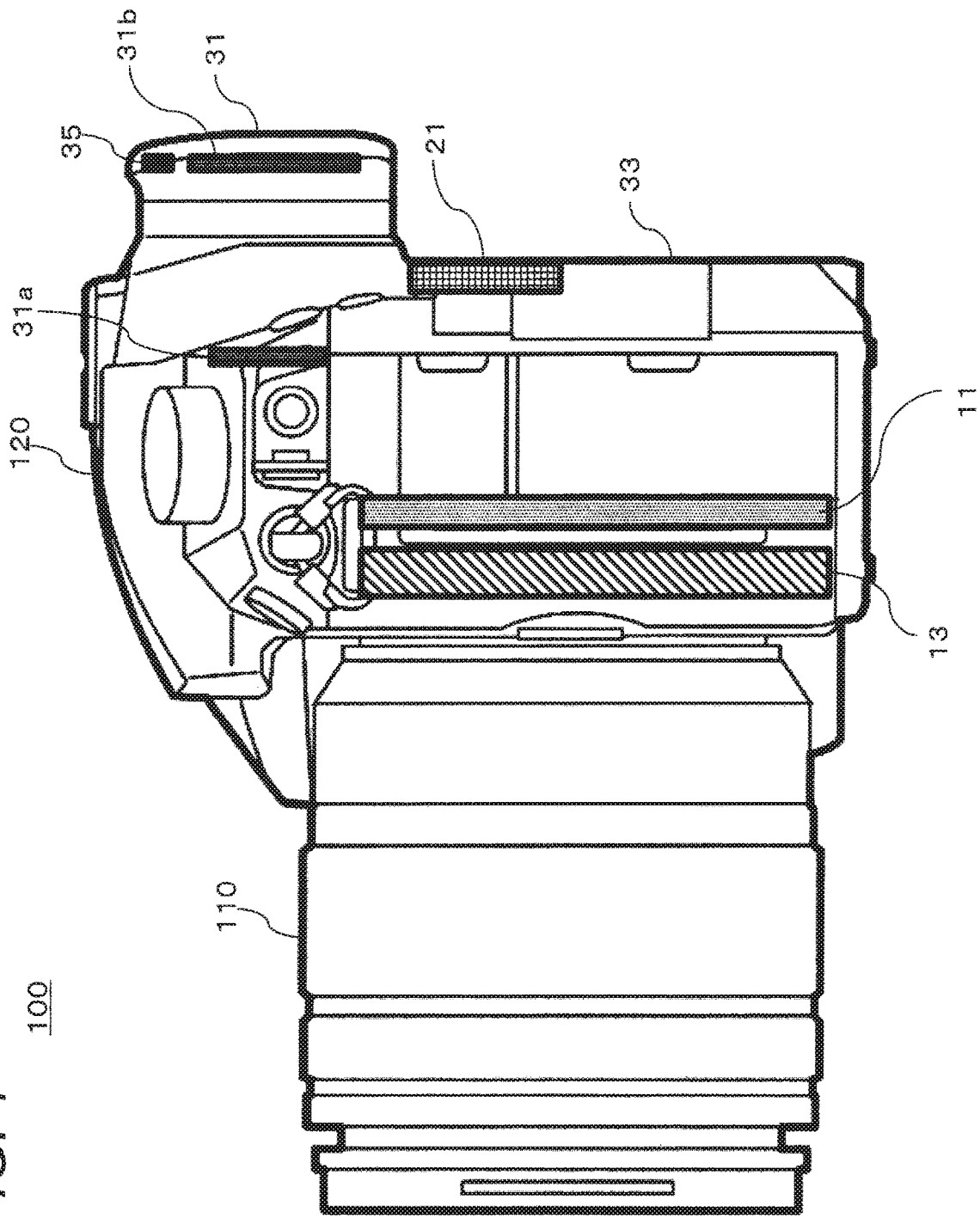
FIG. 1 is a diagram for explaining a positional relationship of a mechanical shutter, a speaker, and the like in a digital camera according to a first embodiment of the present disclosure.

FIG. 1 is a diagram for explaining a positional relationship of a mechanical shutter, a speaker, and the like in a digital camera according to a first embodiment of the present disclosure. A digital camera 100 of this embodiment is a lens-interchangeable camera and is made up of an interchangeable lens 110 and a camera body 120.

The interchangeable lens 110 includes an optical system including a focus lens, a zoom lens, a lens for image stabilization, and a diaphragm, a driver (such as a motor or an actuator) driving the optical system, and a controller controlling the driver, although not shown.

The camera body 120 includes therein an image sensor 11 capturing an object image formed via the interchangeable lens 110, a mechanical shutter 13 exposing the image sensor 11, and a speaker 21 outputting a sound of a sound effect or the like. The mechanical shutter 13 is disposed in front of the image sensor 11, that is, disposed on the relatively front side in the camera body 120. In contrast, the speaker 21 is disposed on the rear side of the camera body 120.

The camera body 120 includes a finder 31 and a monitor 33 on the outside as display apparatuses displaying a live view image and various information. A user can look into the finder 31 with the user's face, i.e., the eye, brought close to the finder 31 so as to view the live view image and the various information displayed on a display device disposed inside the finder 31. Even while the face is separated from the digital camera 100, the user can use the monitor 33 to view the live view image and the various information displayed on the monitor 33.

Figure 2:
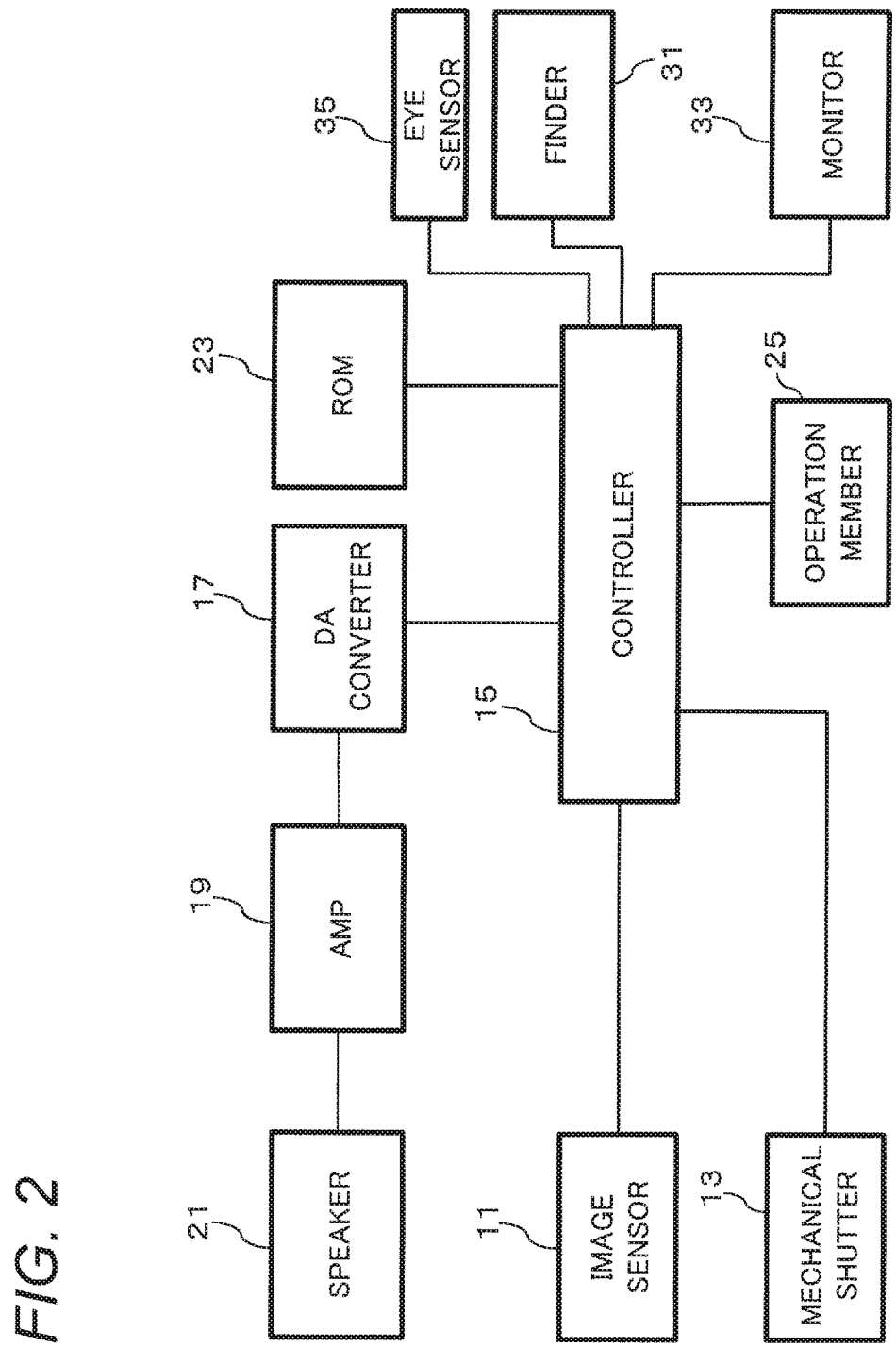
FIG. 2 is a block diagram showing a configuration of the digital camera.

FIG. 2 is a block diagram showing a configuration of the camera body 120 of the digital camera 100. As shown in FIG. 2, the camera body 120 includes, in addition to the image sensor 11 capturing an image, the mechanical shutter 13 exposing the image sensor 11, the finder 31, and the monitor 33, a controller 15 controlling an overall operation of the digital camera 100, the speaker 21 outputting a sound effect such as a shutter sound, an amplifier 19 that is a circuit amplifying an audio signal, a DA converter 17 converting audio data (digital audio signal) into an analog audio signal, and a ROM 23 storing audio data and the like. The camera body 120 further includes an operation member 25 for the user performing operations for giving instructions to and setting the digital camera 100. The camera body 120 also includes, in the vicinity of the finder 31, an eye sensor 35 detecting the proximity of an object. This eye sensor 35 is mainly for the purpose of detecting whether the user's face is close to the finder 31.

The image sensor 11 is a sensor capturing an object image entering through the interchangeable lens 110 and generating an analog image signal. The image sensor 11 is made up of, but not limited to, a CCD image sensor or a CMOS image sensor, for example. The analog image signal generated by the image sensor 11 is converted into digital image data. The image data obtained by the conversion is subjected to various types of image processing by the controller 15. For example, the image processing includes gamma correction processing, white balance correction processing, flaw correction processing, YC conversion processing, electronic zoom processing, image compression processing such as JPEG compression processing, or the like.

The monitor 33 is an apparatus displaying an image represented by the image signal generated by the image sensor 11, various setting information, a menu screen for settings, and the like. The monitor 33 is disposed on a back surface of the camera body 120 as shown in FIG. 1. The monitor 33 is movably attached so that an orientation and/or an angle can be changed relative to the camera body 120. The monitor 33 is made up of a liquid crystal display or an organic electroluminescence display.

The finder 31 is disposed on an upper portion of the back surface of the camera body 120. The finder 31 includes therein a display device 31a such as a liquid crystal display or an organic electroluminescence display. The finder 31 further includes a window 31b made of a transparent member. The finder 31 may movably be attached so that an orientation and/or an angle can be changed relative to the camera body 120. The user can look inside the finder 31 from the window 31b so as to view an image displayed on the display device 31a. In contrast, the monitor 33 has an exposed screen so that the user can view an image displayed on the screen of the monitor 33 even while the face is separated from the monitor 33.

The eye sensor 35 is a sensor detecting the proximity of an object. The eye sensor 35 is disposed in the vicinity of the window 31b of the finder 31. The eye sensor 35 detects the proximity of the user's face to the window 31b of the finder 31.

The controller 15 is made up of a processor such as a CPU or MPU executing a program to implement a predetermined function. Alternatively, the controller 15 may be a processor made up of a dedicated electronic circuit designed to implement a predetermined function. Therefore, the controller 15 can be implemented by various processors such as CPU, MPU, GPU, DSU, FPGA, and ASIC. The controller 15 may be made up of one or more processors.

The ROM 23 is a read-only nonvolatile memory. The ROM 23 is a flash memory, for example.

The operation member 25 includes operation members for the user giving instructions to and setting the digital camera 100. For example, the operation member 25 includes a release button, a moving image recording button, a cursor key, a jog dial, a mode dial, a touch panel, or the like.

The mechanical shutter 13 is an apparatus mechanically operating to adjust the time of exposure of the image sensor 11. For example, the mechanical shutter 13 is made up of a focal plane shutter or a lens shutter. In addition to the mechanical shutter 13, the digital camera 100 according to this embodiment includes an electronic shutter as a function of exposing the image sensor 11. The electronic shutter is a function of controlling a charge time for an electric charge accumulated in the image sensor 11 so as to electronically expose the image sensor 11. The user can arbitrarily set whether to use the mechanical shutter 13 or the electronic shutter as the shutter, with a predetermined button or a menu screen in the digital camera 100.

The DA converter 17 is a circuit that converting audio data into an analog audio signal. The amplifier 19 amplifies the analog audio signal generated by the DA converter 17. The speaker 21 outputs sound based on the audio signal amplified by the amplifier 19. The speaker 21 may output stereo sound or monaural sound. The audio data converted by the DA converter 17 is stored in the flash memory 23.

The digital camera 100 is an example of an imaging apparatus. The finder 31 is an example of a first display. The monitor 33 is an example of a second display. The controller 15 is an example of a controller. The ROM 23 is an example of a memory.

[1-2. Operation]

The digital camera 100 configured as described above will be described particularly in terms of an electronic shutter sound output operation.

At operation of the mechanical shutter 13 in the digital camera 100, a shutter sound occurs due to physical operation of mechanical components such as front and rear curtains or a light-shielding blade. In contrast, the electronic shutter performs an electronic operation, so that no shutter sound occurs originally. However, in consideration of user convenience, an electronically synthesized sound effect is output as a shutter sound from the speaker 21 at the operation of the electronic shutter. In this embodiment, the audio data indicative of the shutter sound of the electronic shutter is generated by sampling the shutter sound of the mechanical shutter 13.

The digital camera 100 of this embodiment includes two display apparatuses, i.e., the finder 31 and the monitor 33. The user can shoot an image by using either the finder 31 or the monitor 33. When the user shoots an image while looking into the finder 31 (hereinafter referred to as "finder shooting"), the user shoots the image with the eye brought close to the finder 31 (i.e., with the face brought close to the camera body 120). On the other hand, when the user shoots an image while viewing the monitor 33 (hereinafter referred to as "monitor shooting"), the user shoots the image with the face separated away from the camera body 120. This makes a distance from the camera body 120 to the user's face, i.e., the ears, different between the finder shooting and the monitor shooting. Therefore, it is considered that the user hears the shutter sound emitted from the camera body 120 in different ways in the cases of the finder shooting and the monitor shooting.

To verify this point, the inventor of the present application measured frequency characteristics at two sound collection positions for the shutter sound from the mechanical shutter 13 and the electronic shutter sound output at the operation of the electronic shutter. The two sound collection positions are positions where the user is presumed to hear the shutter sound at the finder shooting and at the monitor shooting.

Figure 3:
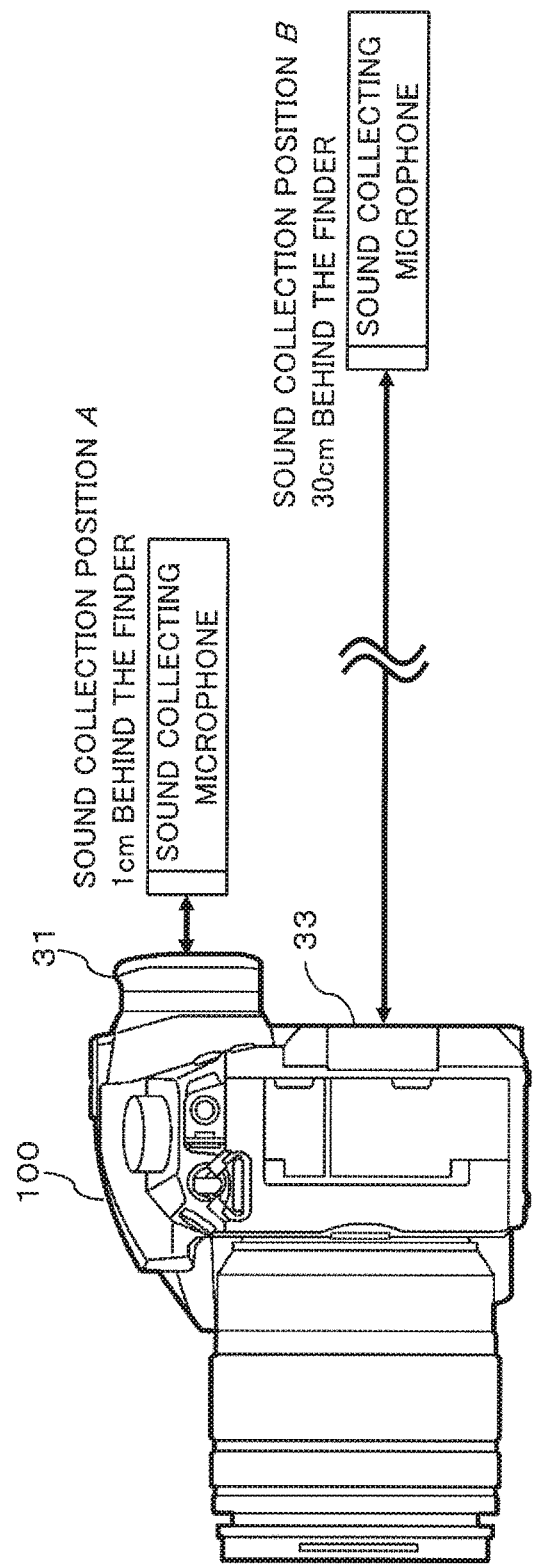
FIG. 3 is a diagram for explaining a sound collection position at the measurement of frequency characteristics of a shutter sound.

FIG. 3 is a diagram for explaining a position of a sound collecting microphone at measurement of the frequency characteristics of the shutter sound. A sound collection position A is a position where the user is presumed to hear the shutter sound at the finder shooting and is a position separated by 1 cm on the back side from the finder 31. A sound collection position B is a position where the user is presumed to hear the shutter sound at the monitor shooting and is set to a position separated by 30 cm on the back side from the monitor 33.

Figure 4:
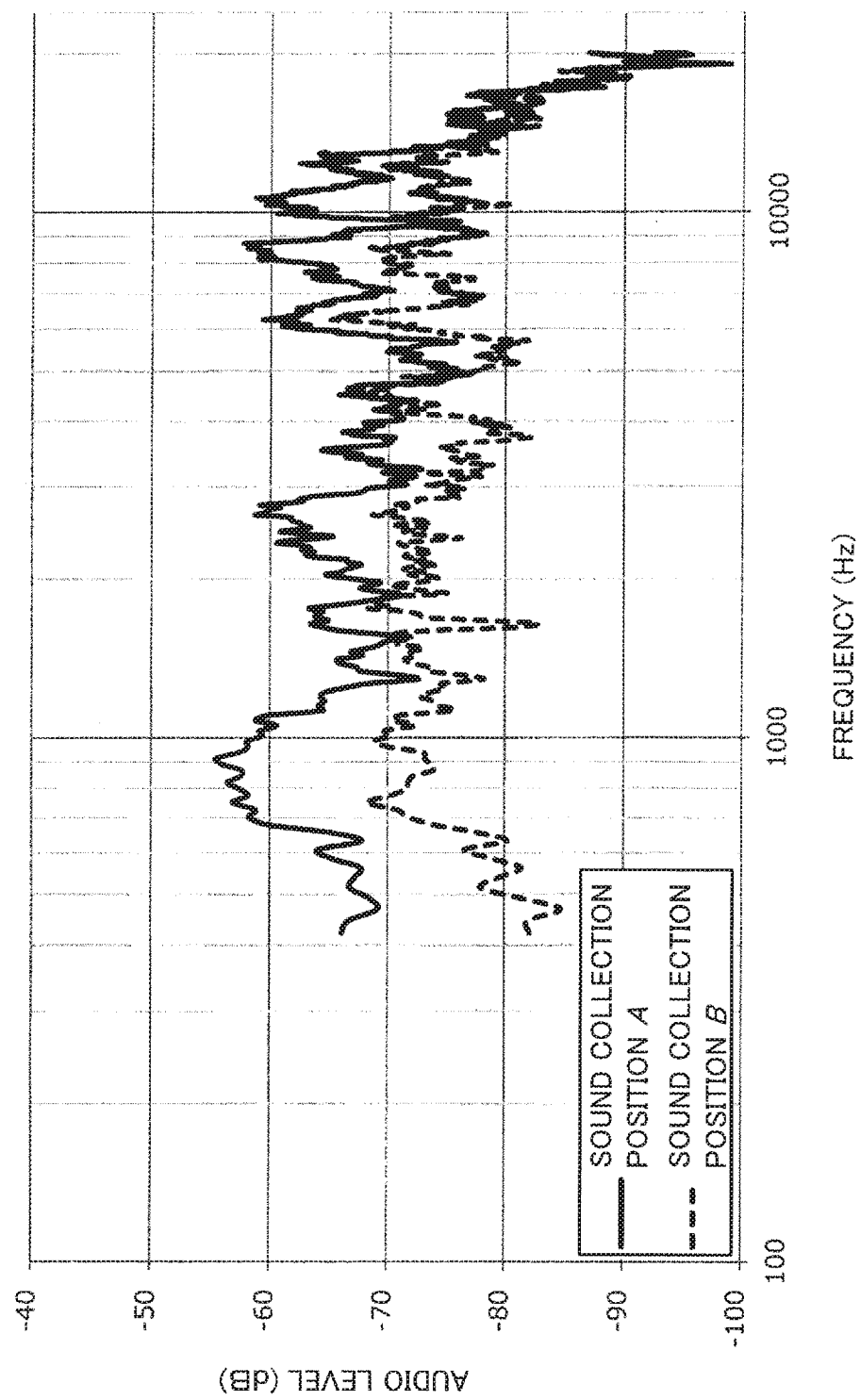
FIG. 4 is a diagram showing frequency characteristics of a shutter sound of a mechanical shutter measured at two sound collection positions.
Figure 5:
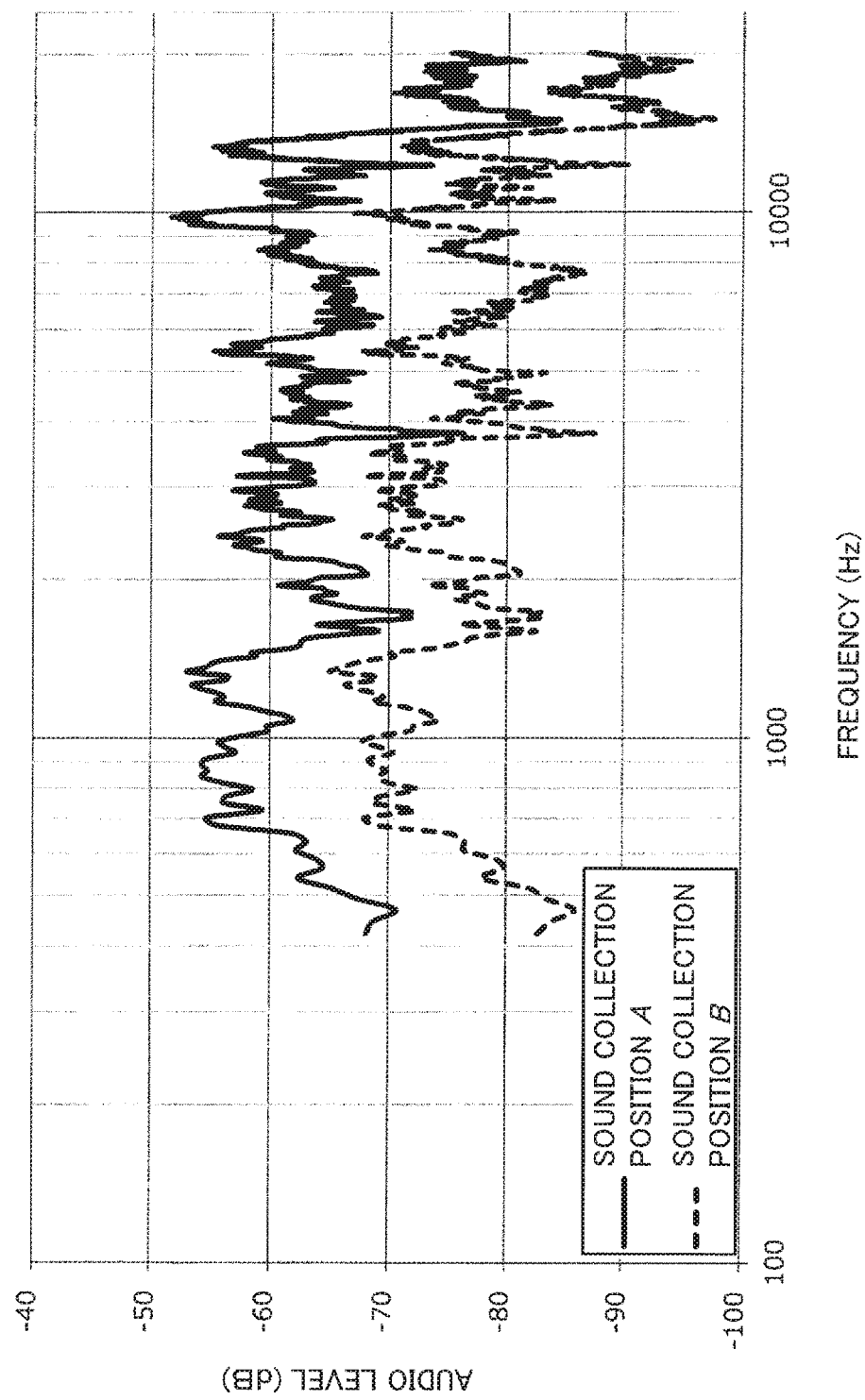
FIG. 5 is a diagram showing frequency characteristics of a shutter sound (sound effect) of a conventional electronic shutter measured at two sound collection positions.

FIG. 4 is a diagram showing frequency characteristics of the shutter sound of the mechanical shutter 13 measured at the sound collection position A and the sound collection position B. FIG. 5 is a diagram showing frequency characteristics of a conventional shutter sound of an electronic shutter measured at the sound collection position A and the sound collection position B. In FIGS. 4 and 5, the horizontal axis indicates the frequency, and the vertical axis indicates the level of the audio signal from the sound collecting microphone. In FIGS. 4 and 5, a solid line indicates the measurement result at the sound collection position A assumed for the finder shooting, and a broken line indicates the measurement result at the sound collection position B assumed for the monitor shooting.

In a conventional digital camera, the shutter sound of the electronic shutter output from the speaker is generically not changed depending on a distance between the digital camera and the user. Therefore, FIG. 5 shows results measured at the sound collection position A and the sound collection position B when the same shutter sound synthesized from the same audio data is output from the speaker 21.

In FIGS. 4 and 5, the measurement result at the sound collection position A shows on the whole a higher level than the measurement result at the sound collection position B. This is because the sound collection position B is separated further from the speaker 21 than the sound collection position A so that the sound reaching the sound collection position B is attenuated due to the distance. Referring to FIG. 4, it can be seen that the frequency characteristics are different between the sound collection position A and the sound collection position B, in the case of the mechanical shutter 13. On the other hand, referring to FIG. 5, the frequency characteristics in the case of the electronic shutter are substantially the same between the sound collection position A and the sound collection position B although levels are different.

Further referring to FIGS. 4 and 5, the shutter sound of the mechanical shutter 13 and the shutter sound of the electronic shutter are very similar to each other in frequency characteristics at the sound collection position B (position assuming monitor shooting), but are significantly different from each other in frequency characteristics at the sound position A (position assuming finder shooting). Specifically, focusing on the sound collection position A, it can be seen that the level of the shutter sound of the mechanical shutter 13 (FIG. 4) is higher than the shutter sound of the electronic shutter (FIG. 5) in a low frequency range and is lower in a high frequency range.

As described above, the shutter sound of the mechanical shutter 13 and the shutter sound of the electronic shutter have the frequency characteristics changing in different ways between the sound collection position A assumed for the finder shooting and the sound collection position B assumed for the monitor shooting. The shutter sound of the electronic shutter, originally a sound imitating the actual shutter sound of the mechanical shutter, is preferably made as close as possible to the actual shutter sound of the mechanical shutter in the sense of hearing.

Based on the measurement results described above, the inventor of the present application found the fact that the frequency characteristics of the shutter sound of the electronic shutter vary between the sound collection position A and the sound collection position B in a different way from those of the mechanical shutter. Furthermore, the inventor obtained the insight that this is one factor reducing the reality of the electronic shutter.

Therefore, the inventor of the present application devised an imaging apparatus capable of changing the frequency characteristic of the shutter sound of the electronic shutter depending on a distance between the digital camera and the user at the finder shooting, and thereby providing audibility closer to the shutter sound of the mechanical shutter.

Figure 6:
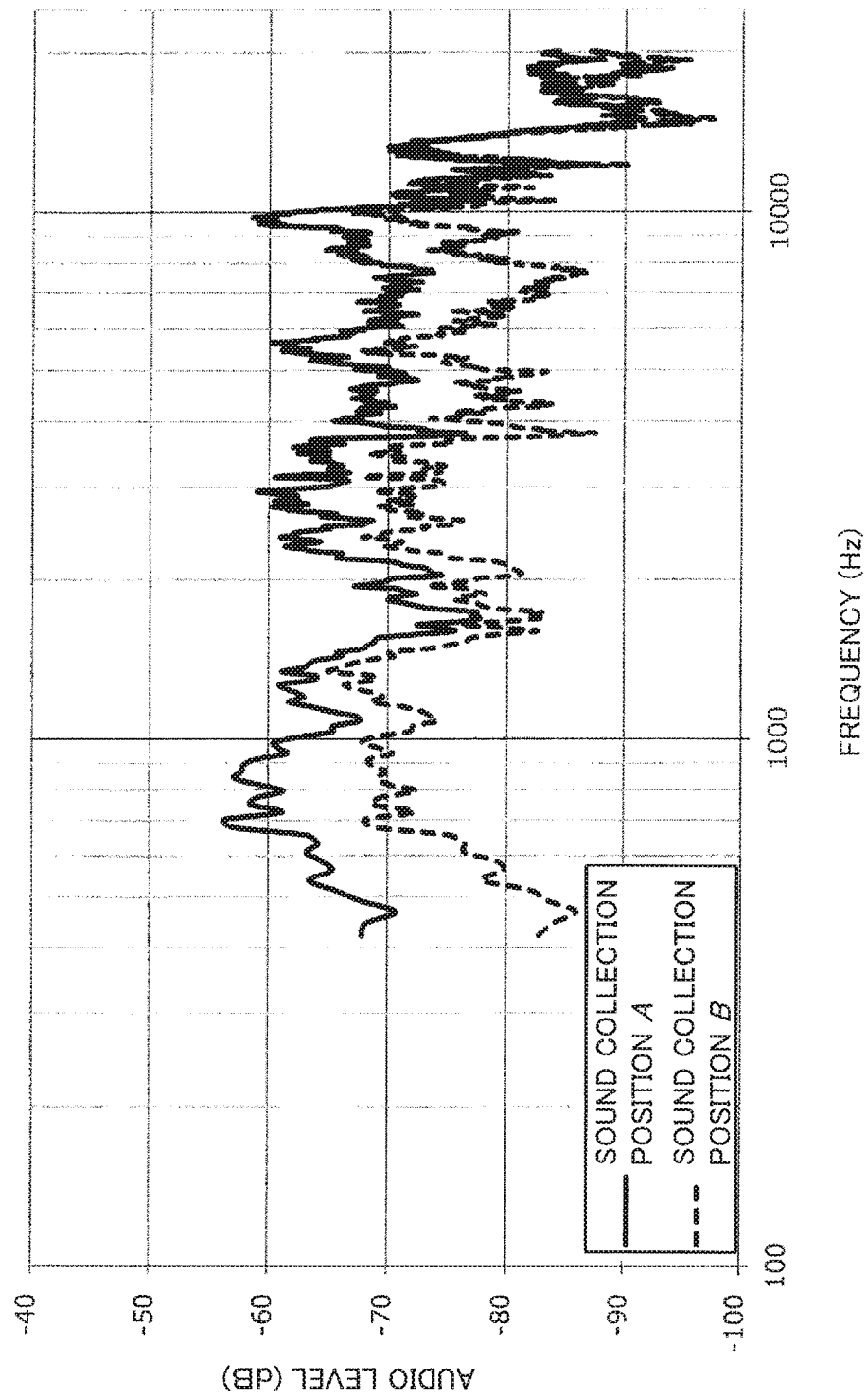
FIG. 6 is a diagram showing frequency characteristics of a sound effect of an electronic shutter in the digital camera of the first embodiment.

FIG. 6 is a diagram showing the frequency characteristics of the shutter sound of the electronic shutter in the digital camera 100 of this embodiment measured at the sound collection position A and the sound collection position B. Comparing the frequency characteristics of the shutter sound of the electronic shutter according to this embodiment shown in FIG. 6 with the frequency characteristics of the shutter sound of the conventional electronic shutter shown in FIG. 5, the frequency characteristics at the sound collection position B are the same but the frequency characteristics at the sound collection position A are different from each other. That is, the characteristics at the sound collection position A are set so as to make a relative relationship between the frequency characteristics at the sound collection position A and the frequency characteristics at the sound collection position B similar to the relative relationship of the mechanical shutter 13. Specifically, the frequency characteristics at the sound collection position A shown in FIG. 6 are set such that a high range (e.g., 10,000 Hz or more) is more attenuated as compared to the frequency characteristics at the sound collection position A shown in FIG. 5.

To this end, the digital camera 100 of this embodiment has the audio data of the shutter sound of the electronic shutter stored in the ROM 23. Particularly, the ROM 23 stores first audio data of the shutter sound of the electronic shutter to be reproduced at the finder shooting and second audio data of the shutter sound of the electronic shutter to be reproduced at the monitor shooting. For example, the first audio data is generated by sampling the shutter sound of the mechanical shutter 13 collected at the sound collection position A, and the second audio data is generated by sampling the shutter sound of the mechanical shutter 13 collected at the sound collection position B. At the finder shooting, the shutter sound reproduced based on the first audio data is output from the speaker 21. At the monitor shooting, the shutter sound reproduced based on the second audio data is output from the speaker 21.

Figure 7:
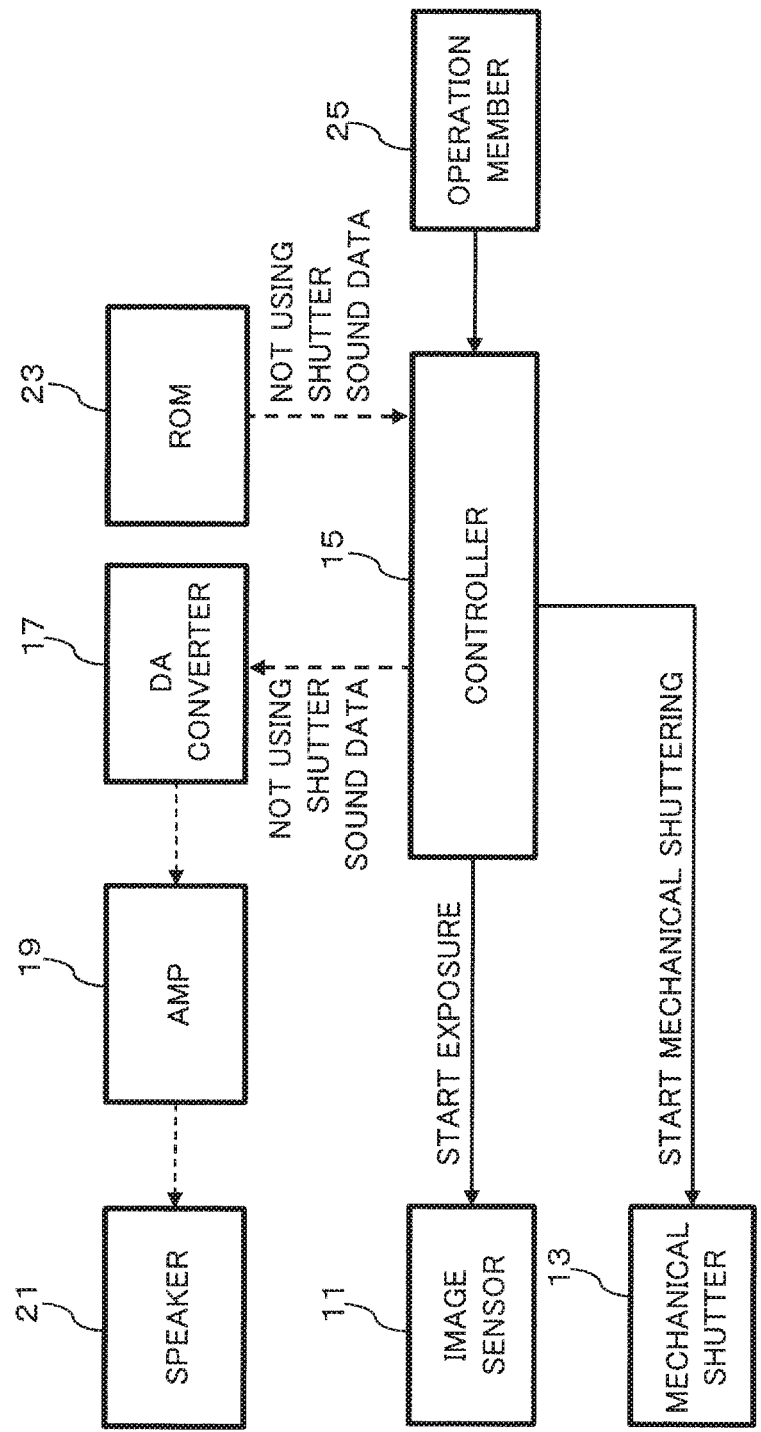
FIG. 7 is a diagram for explaining an operation when a mechanical shutter is used in the digital camera of the first embodiment.

FIG. 7 is a diagram for explaining an operation when the mechanical shutter 13 is used in the digital camera 100. In this case, it is assumed that the mechanical shutter 13 is used as the shutter according to the setting in the digital camera 100.

When the release button of the operation member 25 is pressed by the user, the controller 15 transmits an exposure start command to the image sensor 11. The image sensor 11 starts exposure in response to the exposure start command from the controller 15. The controller 15 further transmits an operation start command to the mechanical shutter 13. The mechanical shutter 13 opens and closes the front and rear curtains at a set shutter speed to expose the image sensor 11. After the shutter operation of the mechanical shutter 13 is completed, the image sensor 11 completes the exposure of all pixels. Subsequently, an image signal generated by the image sensor 11 is subjected to the predetermined image processing, to be recorded on a recording medium (not shown) such as a memory card.

Since the mechanical shutter 13 itself generates a shutter sound, the digital camera 100 outputs no electronic shutter sound from the speaker 21 at operation of the mechanical shutter 13. The audio data of the shutter sound is neither read from the flash memory 23 nor processed by the DA converter 17 and the like.

Figure 8:
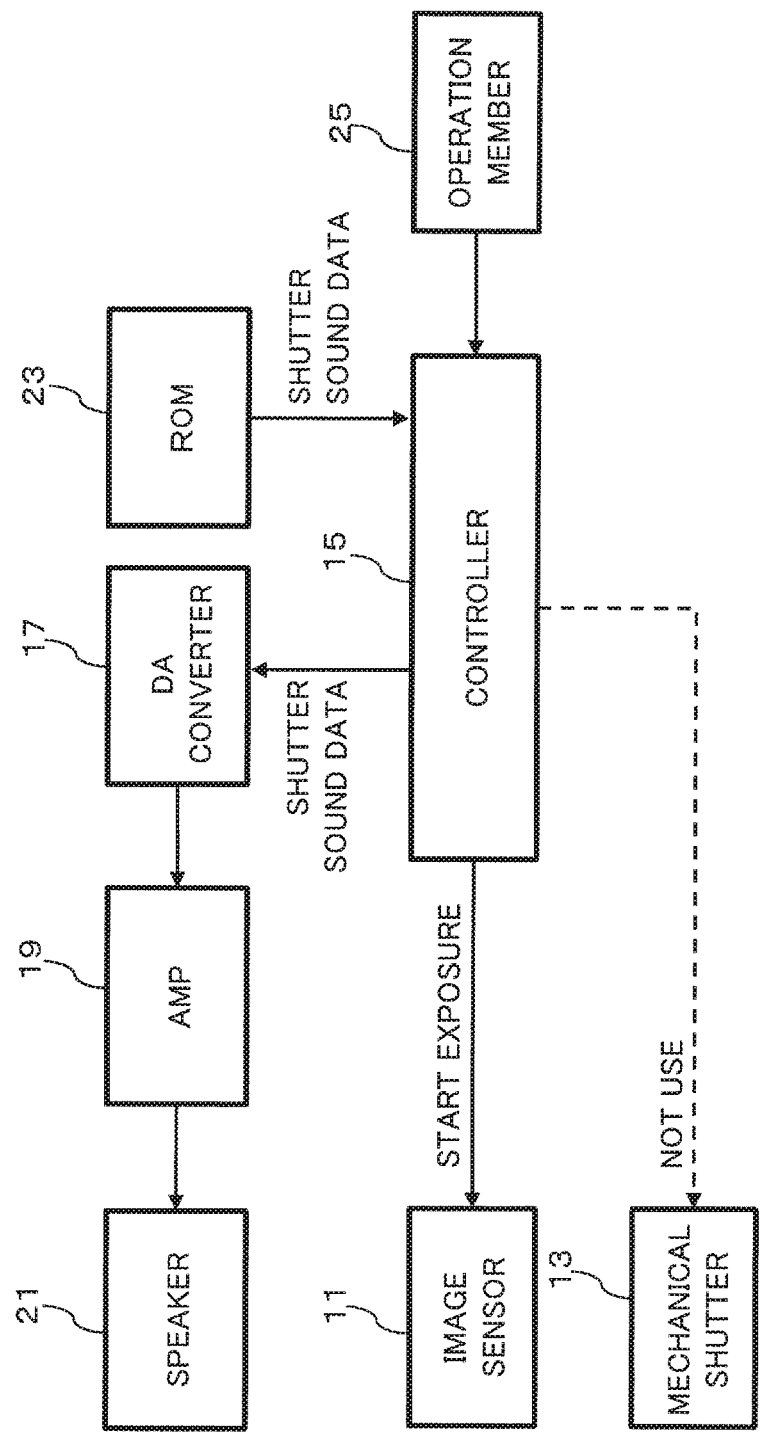
FIG. 8 is a diagram for explaining an operation when the electronic shutter is used in the digital camera of the first embodiment.

FIG. 8 is a diagram for explaining an operation when the electronic shutter is used in the digital camera 100. In this case, it is assumed that the electronic shutter is used as the shutter according to the setting in the digital camera 100.

When the release button of the operation member 25 is pressed by the user, the controller 15 transmits the exposure start command to the image sensor 11. The image sensor 11 starts exposure in response to the exposure start command from the controller 15. The controller 15 reads the audio data of the shutter sound from the ROM 23. In this case, the first audio data or the second audio data is read from the ROM 23 in accordance with whether the finder shooting or the monitor shooting. The read audio data is converted into an analog audio signal by the DA converter 17. The amplifier 19 amplifies and transmits the analog audio signal to the speaker 21. As a result, the speaker 21 outputs the shutter sound. The image signal generated by the image sensor 11 is subjected to the predetermined image processing and recorded on the recording medium (not shown) such as a memory card.

Figure 9:
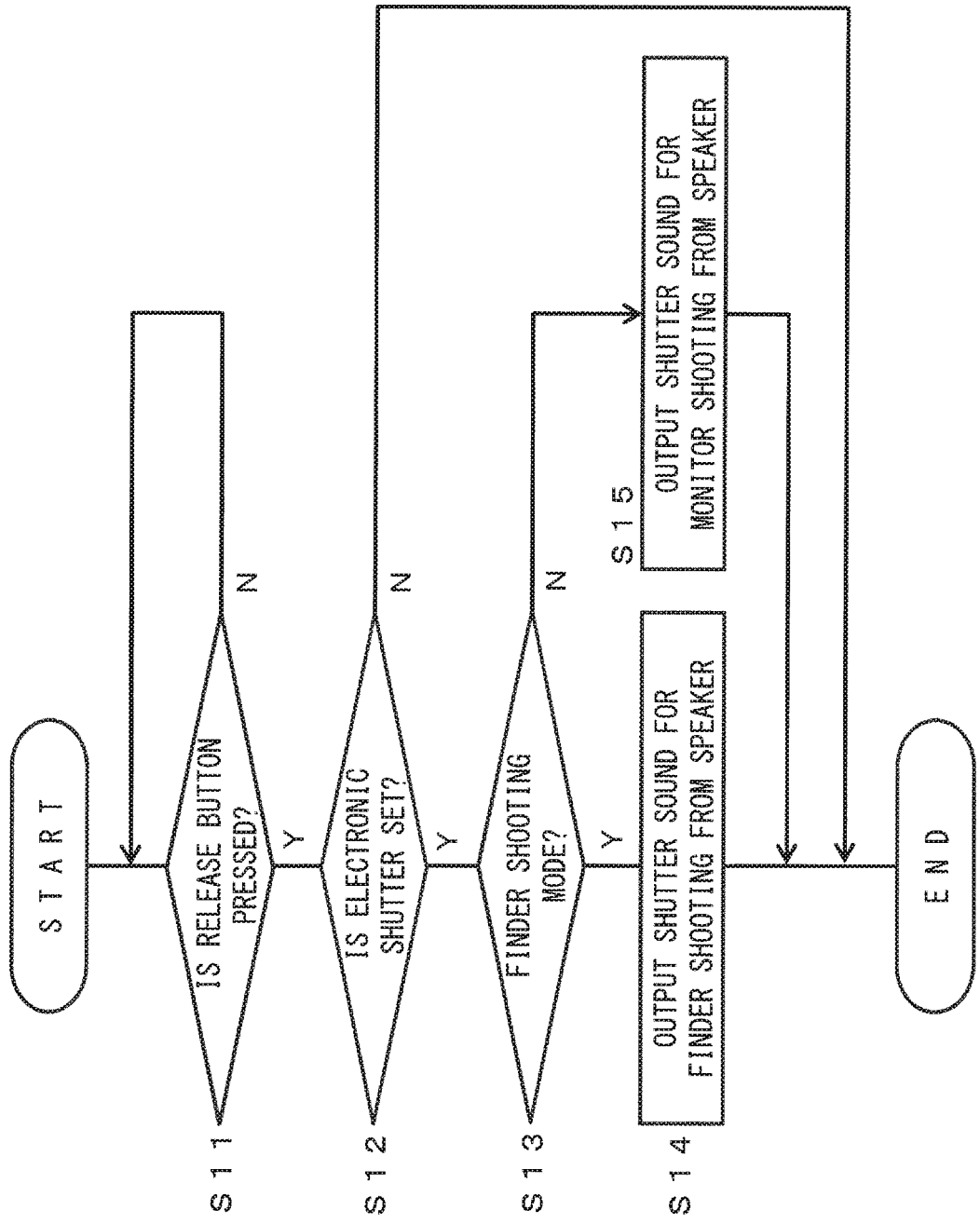
FIG. 9 is a flowchart showing an output process of a sound effect of the electronic shutter according to the first embodiment.

FIG. 9 is a flowchart showing an output process of the sound effect of the electronic shutter in the digital camera 100. The output process of the sound effect of the electronic shutter will be described with reference to the flowchart of FIG. 9.

The controller 15 detects whether the release button of the operation member 25 is pressed by the user (S11). When the release button of the operation member 25 is pressed by the user (YES at S11), the controller 15 determines which of the mechanical shutter 13 and the electronic shutter is set as the shutter (S12). When the mechanical shutter 13 is set (NO at S12), the controller 15 ends this process.

When the electronic shutter is set (YES at S12), the controller 15 determines whether the digital camera 100 is set to a finder shooting mode or a monitor shooting mode (S13).

The controller 15 performs setting to the finder shooting mode or the monitor shooting mode based on a detection signal from the eye sensor 35. Specifically, the controller 15 sets the digital camera 100 to the finder shooting mode when the eye sensor 35 detects the proximity of the object, or to the monitor shooting mode otherwise. When using the finder 31 for photographing, the user brings the face close to the finder 31 so as to look into the finder 31. Therefore, the eye sensor 35 detects that the user brings the face closer to the finder 31, and automatically performs the setting to the finder shooting mode.

In the finder shooting mode, the finder 31 is set as the display apparatus to be operated (functioned). Therefore, in the finder shooting mode, the finder 31 is operated to display the live view image on the display device inside the finder 31, and the monitor 33 is not operated so that the live view image is not displayed on the monitor 33. On the other hand, in the case of setting to the monitor shooting mode, the monitor 33 is set as the display apparatus to be operated (functioned). Therefore, in the monitor shooting mode, the monitor 33 is operated to display the live view image on the monitor 33, and the finder 31 is not operated so that the live view image is not displayed on the display device inside the finder 31.

Setting to the finder shooting mode or the monitor shooting mode can also be performed based on setting by the user. For example, the digital camera 100 can be set to the finder shooting mode or the monitor shooting mode by the user operating a predetermined button or setup menu. When the mode setting is performed in accordance with the user setting, the eye sensor 35 is disabled or the detection signal from the eye sensor 35 is ignored.

When determining that the camera is set to the finder shooting mode (YES at S13), the controller 15 controls to output the shutter sound for the finder shooting from the speaker 21 (S14). In this case, the controller 15 reads out the first audio data to be reproduced at the finder shooting from the ROM 23. The read first audio data is subjected to signal processing by the DA converter 17 and the amplifier 19, and output from the speaker 21 as the shutter sound for the finder shooting.

On the other hand, when determining that the camera is set to the monitor shooting mode (NO at S13), the controller 15 controls to output the shutter sound for the monitor shooting from the speaker 21 (S15). In this case, the controller 15 reads out the second audio data to be reproduced at the monitor shooting from the ROM 23. The read second audio data is subjected to signal processing by the DA converter 17 and the amplifier 19, and output from the speaker 21 as the shutter sound for the monitor shooting. The shutter sound for the finder shooting and the shutter sound for the monitor shooting are output from the speaker 21 at the same level (volume).

As described above, according to the digital camera 100 of this embodiment, different shutter sounds are output from the speaker 21 between the finder shooting and the monitor shooting at operation of the electronic shutter. This enables reproduction of a sound close to the shutter sound heard at operation of the mechanical shutter 13.

[1-3. Effects and the Like]

As described above, the digital camera 100 of this embodiment includes the finder 31, the monitor 33, the speaker 21 outputting the shutter sound (sound effect) for the release button operation, and the controller 15 for controlling the output of the shutter sound (sound effect) from the speaker 21. When the finder 31 is set to be operable, the controller 15 outputs a shutter sound having a first frequency characteristic from the speaker 21 in response to pressing of the release button. When the monitor 33 is set to be operable, the controller 15 outputs a shutter sound having a second frequency characteristic different from the first frequency characteristic from the speaker 21 in response to pressing of the release button.

As described above, the frequency characteristics of the shutter sound output from the speaker 21 are differentiated between when the finder 31 is set to be operable, i.e., when the user is presumed to perform the finder shooting, and when the monitor 33 is set to be operable, i.e., when the user is presumed to perform the monitor shooting. This enables the digital camera 100 to provide the user with an auditory sensation close to the shutter sound emitted from the mechanical shutter 13 in both the finder shooting and the monitor shooting. Therefore, the digital camera 100 can output the sound effect preventing the user from feeling a sense of discomfort in audibility.

The first frequency characteristic has a characteristic having attenuation more than the second frequency characteristic in a range higher than a predetermined frequency (e.g., 10000 Hz). By using such a frequency characteristic, when the user hears the shutter sound from the speaker 21 with the face brought close to the digital camera 100, a high-tone range is reduced. Therefore, it is possible to reduce a situation that a high-pitched sound grates on the ear for the user.

The first frequency characteristic may be set based on the shutter sound of the mechanical shutter 13 collected at the position A separated by a first distance from the back surface of the digital camera 100 (e.g., 1 cm from the finder 31). The second frequency characteristic may be set based on the shutter sound of the mechanical shutter 13 collected at the position B separated by a second distance greater than the first distance from the back surface of the digital camera 100 (e.g., 30 cm from the monitor 33). As a result, when hearing the shutter sound from the speaker 21 in both of a state that the face is brought close to the digital camera 100 and a state that the face is separated away from the digital camera 100, the audibility close to the shutter sound emitted from the mechanical shutter 13 can be provided to the user.

Second Embodiment

In the first embodiment, the sound effect (shutter sound) of the electronic shutter is made different between the finder shooting and the monitor shooting. The sound effect having the frequency characteristics made different between the finder shooting and the monitor shooting is not limited to the shutter sound. A predetermined sound effect output from the speaker 21 in the digital camera 100 may have the frequency characteristics made different between the finder shooting and the monitor shooting. The predetermined sound effect is, for example, a focusing sound output at focusing and a timer sound output by setting of a self-timer. Alternatively, the predetermined sound effect may be a sound output at pressing a moving image recording button for starting or stopping recording of a moving image.

In this case, first audio data for the finder shooting and second audio data for the monitor shooting are stored in advance for the predetermined sound effect in the ROM 23. For example, the first audio data for the finder shooting and the second audio data for the monitor shooting are stored for the focusing sound and the timer sound of the self-timer in the ROM 23.

Figure 10:
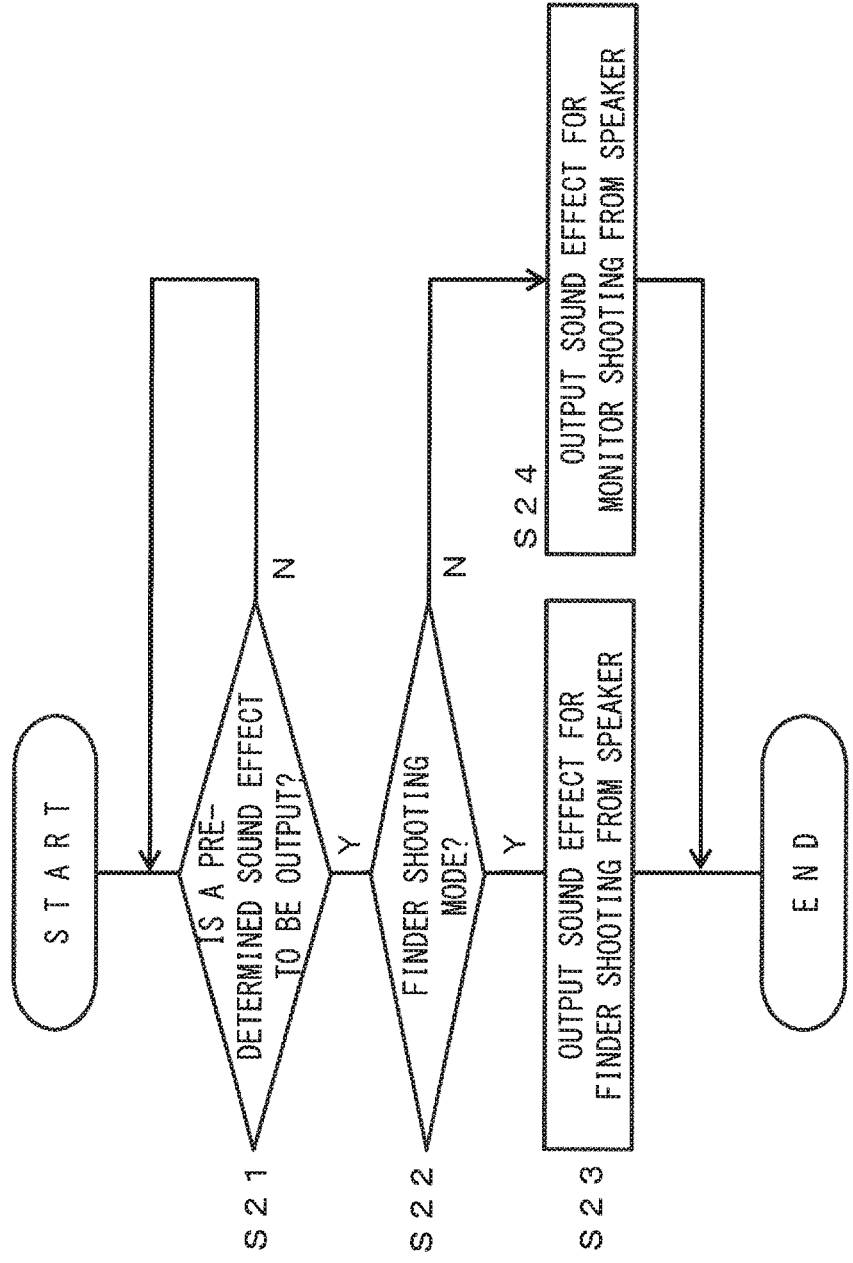
FIG. 10 is a flowchart showing an output process of a predetermined sound effect other than the electronic shutter according to a second embodiment of the present disclosure.

FIG. 10 is a flowchart showing an output process of the sound effect other than the electronic shutter. The controller 15 detects whether a state causing output of a predetermined sound effect is achieved (S21). The predetermined sound effect in this case is the focusing sound output at focusing, the timer sound output during the time of setting of the self-timer or the like.

When detecting a state in which a predetermined sound effect is output (YES at S21), the controller 15 determines whether the digital camera 100 is in the finder shooting mode or the monitor shooting mode (S22).

When it is determined that the camera is in the finder shooting mode (YES at S22), the controller 15 causes the speaker 21 to output the sound effect for the finder shooting related to a detected operation (S23). In this case, the controller 15 reads from the ROM 23 the first audio data related to the detected operation and to be reproduced at the finder shooting. The read first audio data is subjected to signal processing by the DA converter 17 and the amplifier 19, to output from the speaker 21 as the sound effect for the finder shooting.

On the other hand, when it is determined that the camera is in the monitor shooting mode (NO at S22), the controller 15 causes the speaker 21 to output the sound effect for the monitor shooting related to a detected operation (S24). In this case, the controller 15 reads from the ROM 23 the second audio data related to the detected operation and to be reproduced at the monitor shooting. The read second audio data is subjected to signal processing by the DA converter 17 and the amplifier 19, to output from the speaker 21 as the sound effect for the monitor shooting.

For example, regarding the focusing sound, a level of sound in the high frequency range can be reduced in the first audio data for the finder shooting as compared to the second audio data for the monitor shooting, so as to obtain an effect of softening a high-pitched sound grating on the ear when the sound effect is heard at a closer position. Therefore, the digital camera 100 can output the sound effect preventing the user from feeling a sense of discomfort in audibility.

Other Embodiments

As described above, the first and second embodiments have been described as exemplifications of the techniques disclosed in this application. However, the techniques in the present disclosure are not limited thereto and are also applicable to embodiments in which modifications, replacements, additions, omissions, and the like are appropriately made. Additionally, the constituent elements described in the first and second embodiments can be combined to provide a new embodiment. Therefore, other embodiments will hereinafter be exemplified.

In the embodiments described above, at the finder shooting the first audio data is used to generate and output the sound effect from the speaker 21, and at the monitor shooting the second audio data is used to generate and output the sound effect from the speaker 21. Although the sound effects are generated by using the different audio data at the finder shooting and the monitor shooting in this way, the sound effects may be generated by using the same audio data at the finder shooting and the monitor shooting. For example, only the audio data of the sound effect for the monitor shooting may be stored in the ROM 23. In this case, at the monitor shooting the audio data stored in the ROM 23 may be used, and at the finder shooting the audio data stored in the ROM 23 may be subjected to a predetermined filter process to generate the audio data of the sound effect for the finder shooting. Alternatively, only the audio data of the sound effect for the finder shooting may be stored in the ROM 23, and at the monitor shooting the audio data stored in the ROM 23 may be subjected to a predetermined filter process to generate the audio data of the sound effect for the monitor shooting.

In the embodiments described above, the sound collection position A related to the sound effect at the finder shooting is set at the position separated by 1 cm from the finder 31, and the sound collection position B related to the sound effect at the monitor shooting is set at the position separated by 30 cm away from the monitor 33; however, these values are merely examples, and other values may be used.

In the embodiments described above, the imaging apparatus including the mechanical shutter has been described; however, the imaging apparatus may not include the mechanical shutter as long as the electronic shutter function is included. The imaging apparatus may be a single-lens reflex type including a mirror or a mirrorless type as long as the sound effect can be output.

In the embodiments described above, a digital camera with interchangeable lenses has been described as an example of the imaging apparatus; however, the imaging apparatus may have a lens integrated with a body.

Although the digital camera has been described as an example of the imaging apparatus, the idea of the present disclosure is applicable to other types of imaging apparatuses having an image-shooting function and outputting a sound effect from a speaker.

The embodiments have been described as exemplifications of the techniques in the present disclosure. The accompanying drawings and the detailed description have been provided for this purpose.

Therefore, the constituent elements described in the accompanying drawings and the detailed description may include not only the constituent elements essential for solving the problem but also constituent elements not essential for solving the problem so as to illustrate the techniques. Therefore, even though these non-essential constituent elements are included in the accompanying drawings and the detailed description, these non-essential constituent elements should not immediately be recognized as being essential.

Since the embodiment described above is intended to illustrate the techniques in the present disclosure, various modifications, replacements, additions, omissions, and the like can be made within the claims and the scope equivalent thereto.

INDUSTRIAL APPLICABILITY

The present disclosure is useful for an imaging apparatus outputting a sound effect (e.g., shutter sound) from a speaker based on a predetermined operation.

The invention claimed is:

1. An imaging apparatus comprising:
a first display that is operable in a first imaging mode that can be used when a user's face is close to the imaging apparatus;
a second display that is operable in a second imaging mode that can be used when a user's face is away from the imaging apparatus;
a speaker configured to output a sound effect in response to a predetermined operation; and
a controller configured to control an output of the sound effect from the speaker, wherein
the controller is operable to:
in a case where the controller determines that the imaging apparatus is set to the first imaging mode, cause the speaker to output a sound effect having a first frequency characteristic in response to the predetermined operation; and
in a case where the controller determines that the imaging apparatus is set to the second imaging mode, cause the speaker to output a sound effect having a second frequency characteristic in response to the predetermined operation, the second frequency characteristic being different from the first frequency characteristic.

2. The imaging apparatus according to claim 1, wherein the first frequency characteristic is a characteristic having attenuation more than the second frequency characteristic in a range higher than a predetermined frequency.

3. The imaging apparatus according to claim 1, wherein the sound effect is a simulated sound of a shutter sound generated when a mechanical shutter is operated, wherein
the first frequency characteristic is set based on the shutter sound of the mechanical shutter collected at a position separated by a first distance from a back surface of the imaging apparatus, and wherein
the second frequency characteristic is set based on the shutter sound of the mechanical shutter collected at a position separated by a second distance from the back surface of the imaging apparatus, the second distance being greater than the first distance.

4. The imaging apparatus according to claim 1, wherein the sound effect includes at least one of a sound output at focusing, a sound output by setting of a self-timer, and a sound output at a start operation or an end operation of recording of a moving image.

5. The imaging apparatus according to claim 1, further comprising a memory configured to store first audio data indicative of the sound effect having the first frequency characteristic and second audio data indicative of the sound effect having the second frequency characteristic, wherein
the controller is operable to generate the sound effect having the first frequency characteristic based on the first audio data, and generate the sound effect having the second frequency characteristic based on the second audio data.

6. The imaging apparatus according to claim 1, further comprising a memory configured to store audio data indicative of the sound effect having one of the first and second frequency characteristics, wherein
the controller is operable to generate the sound effect having the one of the first and second frequency characteristics based on the audio data, and wherein
the controller is operable to apply a predetermined filter process to the audio data to generate the sound effect having the other of the first and second frequency characteristics.

7. The imaging apparatus according to claim 1, wherein the first display is a display apparatus including a display device configured to display an image, the display apparatus configured to allow a user looking into a window to view the image displayed on the display device, and
the second display is a display apparatus configured to display an image on an exposed display screen.

8. The imaging apparatus according to claim 1, further comprising a sensor configured to detect whether the user's face is close to or away from the imaging apparatus, wherein the controller is operable to:
in a case where the sensor detects the user's face is close to the imaging apparatus, set the imaging apparatus to the first imaging mode; and
in a case of the sensor detects the user's face is away from the imaging apparatus, set the imaging apparatus to the second imaging mode.

9. The imaging apparatus according to claim 1, further comprising
a setting interface configured to set the imaging apparatus to the first imaging mode or the second imaging mode, based on a user setting, wherein
the controller determines whether the setting interface sets the imaging apparatus to the first imaging mode or the second imaging mode.

10. The imaging apparatus according to claim 1,
wherein the first frequency characteristic resembles, at a first position, a predetermined sound more than the second frequency characteristic, the first position being closer to the imaging apparatus than a second position,
wherein the second frequency characteristic resembles, at the second position, the predetermined sound more than the first frequency characteristic.

* * * * *